(12) United States Patent
Diebold et al.

(10) Patent No.: US 11,732,488 B2
(45) Date of Patent: Aug. 22, 2023

(54) VEHICLE FOR A THICK MATTER PUMP APPARATUS

(71) Applicant: Putzmeister Engineering GmbH, Aichtal (DE)

(72) Inventors: Martin Diebold, Reutlingen (DE); Jan-Martin Veit, Pliezhausen (DE)

(73) Assignee: Putzmeister Engineering GmbH, Aichtal (DE)

(*) Notice: Subject to any disclaimer, the term of this patent is extended or adjusted under 35 U.S.C. 154(b) by 109 days.

(21) Appl. No.: 17/427,353

(22) PCT Filed: Jan. 29, 2020

(86) PCT No.: PCT/EP2020/052154
§ 371 (c)(1),
(2) Date: Jul. 30, 2021

(87) PCT Pub. No.: WO2020/157124
PCT Pub. Date: Aug. 6, 2020

(65) Prior Publication Data
US 2022/0128069 A1   Apr. 28, 2022

(30) Foreign Application Priority Data
Jan. 30, 2019  (DE) ..................... 10 2019 201 182.9

(51) Int. Cl.
*F15B 13/02* (2006.01)
*E04G 21/04* (2006.01)
*B60S 9/10* (2006.01)

(52) U.S. Cl.
CPC .......... *E04G 21/0436* (2013.01); *B60S 9/10* (2013.01); *E04G 21/0463* (2013.01);
(Continued)

(58) Field of Classification Search
CPC ... E04G 21/0436; E04G 21/0463; B60S 9/10; F15B 13/02; F15B 2211/3059; F15B 2211/3144; F15B 2211/3138; B66C 23/80
See application file for complete search history.

(56) References Cited

U.S. PATENT DOCUMENTS 5,634,334 A * 6/1997 Hehl ..................... B29C 45/82
                                                    91/363 R
5,640,850 A   6/1997 Benckert et al.
(Continued)

FOREIGN PATENT DOCUMENTS

CN          103062610 A      4/2013
DE    10 2018 202 148 B3     3/2019
(Continued)

OTHER PUBLICATIONS

International Search Report (PCT/ISA/210) issued in PCT Application No. PCT/EP2020/052154 dated May 14, 2020 with English translation (five (5) pages).
(Continued)

*Primary Examiner* — Thomas E Lazo
(74) *Attorney, Agent, or Firm* — Crowell & Moring LLP

(57) ABSTRACT

A vehicle having a thick matter pump has multiple supporting devices, a rotatable mast assembly with part-mast members, and a hydraulic drive assembly with hydraulic drives for the supporting devices and the mast assembly. A valve assembly is provided for the hydraulic drive assembly. The valve assembly has a group of proportional valves and a group of switching valve devices which are each connected to at least one hydraulic drive of the supporting devices or the part-mast members. The switching valve devices are connected downstream of the proportional valves. Exactly one switching valve device is supplied by exactly one proportional valve and is connected downstream of exactly one proportional valve such that outputs of the proportional valves lead exclusively to inputs of the switching valve devices.

14 Claims, 3 Drawing Sheets

(52) U.S. Cl.
CPC ....... *F15B 13/02* (2013.01); *F15B 2211/3059* (2013.01); *F15B 2211/3138* (2013.01); *F15B 2211/3144* (2013.01); *F15B 2211/7142* (2013.01)

(56) References Cited

U.S. PATENT DOCUMENTS

| | | | | |
|---|---|---|---|---|
| 6,431,050 B1* | 8/2002 | Hausman | .............. | E02F 9/2225 |
| | | | | 91/526 |
| 9,695,604 B2* | 7/2017 | Trümper | ................. | E02F 9/123 |
| 10,989,231 B2* | 4/2021 | Wechsel | ............. | F15B 13/0402 |
| 2018/0051475 A1* | 2/2018 | Klein | ...................... | B66C 23/80 |

FOREIGN PATENT DOCUMENTS

| | | | | |
|---|---|---|---|---|
| EP | 0 670 946 B1 | 10/1998 | | |
| EP | 2 594 807 A1 | 5/2013 | | |
| EP | 2594807 A1 * | 5/2013 | ............. | F15B 11/16 |
| WO | WO 2013/021404 A2 | 2/2013 | | |
| WO | WO-2013021404 A2 * | 2/2013 | ............. | B66C 23/80 |
| WO | WO-2018100074 A2 * | 6/2018 | ......... | E04G 21/0436 |

OTHER PUBLICATIONS

German-language Written Opinion (PCT/ISA/237) issued in PCT Application No. PCT/EP2020/052154 dated May 14, 2020 (five (5) pages).

German-language Office Action issued in German Application No. 10 2019 201 182.9 dated Sep. 19, 2019 translation (7 pages).

\* cited by examiner

VEHICLE FOR A THICK MATTER PUMP APPARATUS

BACKGROUND AND SUMMARY OF THE INVENTION

The invention relates to a vehicle having a mast arrangement, wherein at least one supporting device is also provided on the vehicle.

Such vehicles also have, for example, a thick matter pump and are then also known as concrete pumps. They have a hydraulic drive arrangement with which both the mast arrangement and the at least one supporting device can be moved. The supporting device serves to support or align the vehicle. The mast arrangement is subsequently moved and aligned hydraulically and serves, for example, to move concrete by means of the concrete pump or thick matter pump on a building site to a specific point for further processing.

The hydraulic drive arrangements and above all the valve arrangements are relatively complex and thus expensive to provide.

DE 10 2018 202 148 B3 discloses a mobile hydraulic system for, for example, a mobile crane which can actuate retractable and extendable connecting pieces as well as a mast which can be moved in a versatile manner. The mobile hydraulic system has in this case two directional control valves corresponding to proportional valves, downstream of which in each case a switching valve is connected. Two outputs as hydraulic consumer ports can be supplied with each switching valve.

EP 2 594 807 A1 discloses a hydraulic system for, for example, a mobile elevating work platform. Multiple proportional valves in a valve arrangement are also known here, downstream of which shifting elements are connected as switching valve apparatuses. Work machines formed as hydraulic cylinders can be driven by means of these shifting elements.

EP 0 670 946 B1 discloses a vehicle with supports, a mast arrangement and a thick matter pump, wherein the supports and the mast elements are driven with individual hydraulic cylinders. A proportional valve is provided as a control valve for each of the hydraulic cylinders.

The object on which the invention is based is to create an above-mentioned vehicle with which problems of the prior art can be solved and it is in particular possible to provide a hydraulic drive arrangement and valve arrangement with a simpler formation.

This object is achieved by a vehicle with the features of the independent claim. Advantageous and preferred configurations of the invention are the subject matter of the dependent claims and are explained in greater detail below. The wording of the claims is made by express reference to the content of the description.

It is provided that the vehicle has the at least one supporting device in order to be able to support and orient it. This advantageously involves at least two supporting devices, particularly advantageously at least four supporting devices which are arranged in a distributed manner, preferably two on each side. A mast arrangement which is rotatable is provided at or on the vehicle. It has several partial mast elements which are movable independently of one another so that, in addition to the rotary drive for the mast arrangement, each of the partial mast elements also advantageously has its own hydraulic drive. These hydraulic drives are part of a hydraulic drive arrangement which is provided for the at least one supporting device and the mast arrangement. The several hydraulic drives can take on in each case the movement of each supporting device and each of the movable partial mast elements, advantageously as hydraulic cylinders. A hydraulic drive is likewise also advantageously provided for rotation of the mast arrangement with respect to the vehicle, which hydraulic drive is specifically formed for this purpose.

In order to actuate the hydraulic drive arrangement, an above-mentioned valve arrangement is provided which actuates the hydraulic drives of the hydraulic drive arrangement in a manner known per se. Each supporting device and/or each of the partial mast elements and thus the entire mast arrangement can be moved in this way.

According to the invention, it is provided that the valve arrangement has a group of proportional valves, i.e. at least two proportional valves, with which the hydraulic drive arrangement can be acted upon or which are formed for the control of the hydraulic drive arrangement. As a result of the formation as proportional valves, such a control can be very sensitive and be performed very precisely. The hydraulic drives of the drive arrangement can thus be effectively controlled in order in turn to be able to effectively control or move the functional units, driven by said hydraulic drives, of the at least one supporting device or the partial mast elements. The valve arrangement furthermore has a group of switching valve apparatuses, i.e. at least two switching valve apparatuses, which are connected in each case to at least one hydraulic drive, i.e. to a hydraulic drive of the at least one supporting device or the partial mast elements. The stated switching valve apparatuses are connected downstream of the proportional valves, wherein precisely one switching valve apparatus or several switching valve apparatuses are supplied by in each case precisely one proportional valve or are connected downstream of precisely one single proportional valve. The outlets are guided from at least two proportional valves exclusively to inlets of the switching valve apparatuses, i.e. not yet guided directly to one of the hydraulic drives from these two proportional valves. This therefore means that it can be achieved with the invention that a switching valve apparatus is connected downstream at least for two proportional valves, advantageously for yet more proportional valves of the valve arrangement, which switching valve apparatus can as it were steer the control of the movement of the proportional valves to various hydraulic drives. As a result of this, the number of complex proportional valves can be reduced and, as a result of the switching valve apparatuses connected downstream of these proportional valves, control of the movement or concretely the hydraulic fluid can be ensured to the hydraulic drive which should be driven. Prior to an actuation or activation of a hydraulic drive, this is then only to be actuated or set by means of the switching valve apparatus, the structural outlay can overall, however, be significantly reduced.

The vehicle itself preferably has a thick matter pump or can be connected to such a pump which pumps thick matter or concrete into a pipeline which is fastened to the mast arrangement. This is known.

The outlets are advantageously guided from all the proportional valves exclusively to inlets of the switching valve apparatuses so that the number of the proportional valves required can be maximally reduced.

In a further advantageous configuration of the invention, precisely one single switching valve apparatus is connected downstream in each case of precisely one single proportional valve, i.e. supplied by it. This can particularly advantageously be provided for each proportional valve of the valve arrangement so that precisely one single switching valve apparatus is connected downstream of precisely one single proportional valve. These switching valve apparatuses can then be formed to be similar or identical and be similarly grouped, which is explained in greater detail below.

It can namely advantageously be provided that all the switching valve apparatuses have between one another the same setting possibilities and adjustment possibilities so that they functionally correspond to one another. In a yet further advantageous configuration of the invention, it can be provided that all the switching valve apparatuses are identical. Costs and outlay can thus be reduced during production and above all also during repair because the variety of parts required is reduced.

In a yet further configuration of the invention, it can be provided that all the proportional valves likewise have between one another the same setting possibilities and adjustment possibilities, particularly advantageously are also identical. The above-mentioned advantage of reduced outlay can thus also be achieved.

In an alternative configuration, it can be provided for improved adaptation to the respective application that the proportional valves are different, advantageously at least two different types of proportional valves can be provided. These may vary in particular in terms of valve placement, which can particularly advantageously have an effect on their oil quantity setting or passage and/or on a central position of a valve of these proportional valves, generally for the hydraulic fluid. It can thus be provided that some proportional valves are configured for larger quantities of hydraulic fluid as throughput because the hydraulic drives which can be actuated thereby require a higher throughput.

In the case of the invention, it is provided that each of the switching valve apparatuses has between two outputs and five outputs. Three or four outputs or even only precisely three outputs are particularly advantageous so that the technical complexity of a switching valve apparatus moves in technically expedient limits. Each of the outputs of a switching valve apparatus has two ports which lead to or into the switching valve apparatus. Each output can thus advantageously lead to one of the hydraulic drives of the supporting devices or to one of the hydraulic drives of the mast arrangement. It is thus provided in the case of the invention that in the case of each switching valve apparatus precisely two outputs lead to hydraulic drives of the supporting device and precisely one output to hydraulic drives of the mast arrangement. In the case of these two outputs to the hydraulic drives of the at least one supporting device, preferably to several supporting devices, it can be provided that at least one supporting device is arranged on each side of the vehicle, advantageously two supporting devices on each side. These supporting devices can then be grouped into a left-hand side of the vehicle and into a right-hand side of the vehicle. It can thus be set above all in the case of two supporting devices on each side by means of switching valve apparatuses that at precisely one point in time only the supporting devices on the left-hand side or only the supporting devices on the right-hand side can be operated or moved. The proportional valves are then connected by means of the switching valve apparatuses only to these sub-groups of supporting devices, as a result of which easier orientation of the vehicle is possible and above all operating errors can be reduced. In a corresponding form, it can then be provided that, in one position of the switching valve apparatuses, only the hydraulic drives of the mast arrangement can be moved or actuated so that there is no possibility of a negative effect on the orientation or support of the vehicle, while in actual fact the mast arrangement should be moved during the primary operation of the vehicle.

It can advantageously be provided that several outputs are arranged on each switching valve apparatus in a row, particularly preferably all the outputs of this switching valve apparatus. It can, for example, be provided that the outputs at the start of the row and at the end of the row lead in each case to one of the hydraulic drives of the supporting devices if several supporting devices are provided. A central output of the row can then lead to one of the hydraulic drives of the mast arrangement. The hydraulic drives at the start of the row and at the end of the row are then advantageously guided to supporting devices on in each case the left-hand or in each case the right-hand side of the vehicle.

It is advantageously provided that a selector operating mode valve is connected upstream of the group of proportional valves, and indeed between the group of proportional valves and an oil pump or pump for hydraulic fluid. It can particularly advantageously be provided that only a single feed to the oil pump is provided, wherein here an inlet module can also be connected upstream of the selector operating mode valve. Such a selector operating mode valve is preferably formed to adjust the switching valve apparatuses. In particular the selector operating mode valve can be formed to adjust several or advantageously all the switching valve apparatuses simultaneously and in the same manner between in each case a position for an output. In relation to the above-mentioned formation of the switching valve apparatuses with rows of outputs, this means that they are adjusted simultaneously and in the same manner between in each case a position for one of these outputs. In a yet further configuration of the invention, it can be provided that an adjustment of the switching valve apparatuses by means of the stated selector operating mode valve adjusts these switching valve apparatuses either for actuation of hydraulic drives only of the supporting devices on one hand or for actuation of hydraulic drives only of the mast arrangement on the other hand. There thus is so-to-say a supporting operating mode and a mast operating mode, wherein the supporting operating mode can be still subdivided into a left-hand side and a right-hand side of the vehicle. The hydraulic drives in the supporting devices can thus be subdivided into at least two groups, advantageously into precisely two groups, namely left-hand side of the vehicle and right-hand side of the vehicle. As a result of this, it can advantageously be achieved that on both sides no supporting device can be adjusted jointly or simultaneously, rather only on one side or on the other side. Safety during operation of the vehicle or a thick matter pump can thus be improved, in particular in the case of the highly safety-relevant support of the vehicle.

In an advantageous configuration of the invention, a monitoring apparatus is provided which is formed to ascertain whether all the switching valve apparatuses are in the same position. As described above, they can then namely actuate only hydraulic drives of the supporting devices on one hand or only hydraulic drives of the mast arrangement on the other hand or a separate group of hydraulic drives. This monitoring apparatus should therefore additionally serve to ensure or monitor the above-mentioned increase in safety. It is advantageously provided that the monitoring apparatus closes a safety valve in the event that not all of the switching valve apparatuses are in the same position. This safety valve is in turn connected upstream of the proportional valves, preferably is also connected upstream of the selector operating mode valve. The entire valve arrangement thus cannot bring about any pressure change or any actuation for one of the hydraulic drives of the hydraulic drive arrangement if all of the switching valve apparatuses are not in the same position.

In a first configuration of the invention, the stated monitoring apparatus can have means for hydraulic feedback, in particular a hydraulic line. These means for hydraulic feedback lead from each switching valve apparatus through all the pre-selector valves of the switching valve apparatuses in such a manner that they form a continuous or open feedback line to the safety valve. This feedback line is open in fact in the event that all the pre-selector valves of all the switching valve apparatuses are in the same position. The feedback line is interrupted in the event that at least one pre-selector valve of a switching valve apparatus is in a different position to at least one pre-selector valve of a different switching valve apparatus, i.e. if the position of a pre-selector valve differs from a position of one of the other pre-selector valves. In the case of this interrupted feedback line, the safety valve closes so that the proportional valves can also not be actuated or no hydraulic driving can be performed.

In a second configuration of the invention, the monitoring apparatus does indeed also have means for feedback, but these means are formed electrically or are formed for electric feedback. In this case too, an electric line can lead as a feedback line through all the pre-selector valves of the switching valve apparatuses, for example, be formed by corresponding electric switches or contact means so that the electric feedback line is continuously or closed as an electric contact in the event that all the pre-selector valves of all the switching valve apparatuses are in the same position. An electric feedback is interrupted in the other event that not all of the pre-selector valves of the switching valve apparatuses are in one or in the same position.

In comparison with the two above-mentioned possibilities for forming the feedback, a hydraulic feedback is more functionally reliable since the condition must precisely be satisfied that all the pre-selector valves of the switching valve apparatus are in the same position. If this condition is not satisfied, which can hardly be the case in the event of a malfunction of the hydraulic feedback, the hydraulic drives cannot be activated. In the case of an electric feedback, a through-contact could potentially also arise as a result of other errors, with the likelihood of this being low, with it being possible to yet further reduce the risk in a structural-constructive manner.

It is advantageously provided that the switching valve apparatuses and/or the above-mentioned selector operating mode valve can be actuated electrically by means of an actuation apparatus. This is particularly advantageously performed electrohydraulically in order to be able to effectively apply possible actuating forces.

An actuation apparatus can have operating elements for an operator, for example, push buttons or levers, in order to actuate the individual hydraulic drives. The operating elements of the actuation device are advantageously provided centrally or jointly, for example, at a so-called central operating point. Here, an operator can thus control the above-mentioned functional units of the at least one supporting device and the mast arrangement, and indeed with relative ease at one point. Such an actuation apparatus can advantageously be at a short distance from the at least one supporting device and the mast arrangement on the grounds of operational safety or accident prevention, possibly also to have an improved operational overview. The actuation apparatus can have a type of control desk or operating desk, as is known per se. It can also be formed as a wireless remote control and thus to be mobile in order to be able to use it at some distance from the vehicle.

In a further advantageous configuration of the invention, it can be provided that the valve arrangement has a joint valve carrier. All the proportional valves and all the switching valve apparatuses can thus advantageously be arranged on the joint valve carrier. As a result of this, a hydraulic connection is easily possible. The above-mentioned selector operating mode valve can also be provided here. The valve carrier can advantageously have a carrier plate in order to fasten the stated proportional valves and switching valve apparatuses thereon. A supply line of hydraulic fluid from the above-mentioned oil pump is thus very possible. Moreover, the advantageous monitoring apparatus described above can also be well structured with the two possibilities for feedback since the switching valve apparatuses themselves are provided close to one another.

These and further features are furthermore apparent from the claims and from the description and the drawings, wherein the individual features can be achieved in each case on their own or in a multiplicity in the form of sub-combinations in the case of one embodiment of the invention and in other fields and can represent advantageous embodiments which are also capable of being protected and for which protection is claimed here. The separation of the application into individual sections and intermediate titles does not restrict the statements made under these in their general validity.

BRIEF DESCRIPTION OF THE DRAWINGS

An exemplary embodiment of the invention is represented schematically in the drawings and is explained in greater detail below.

DETAILED DESCRIPTION OF THE EXEMPLARY EMBODIMENTS

Figure 1:
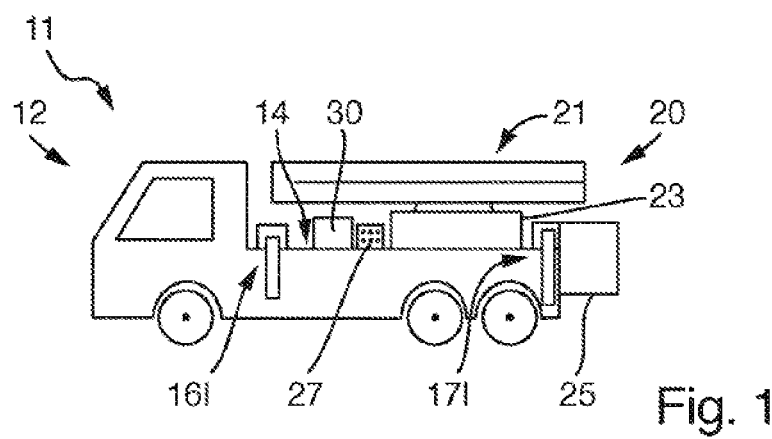
FIG. 1 shows a simplified schematic representation of a vehicle according to an embodiment of the invention as a so-called concrete pump with supports and a mast arrangement.

FIG. 1 represents a vehicle 11 which is also known as a so-called concrete pump. Vehicle 11 has a driver's cabin 12 at the front and at the rear a large utility surface 14. Two supports 16 are provided at the front and two supports 17 are provided at the rear on the utility surface, two on each side which are formed in the familiar manner. A support 16*l* at the front left is represented which can also be extended to different lengths, as is also illustrated below. A support 17*l* is provided at the rear left. Both supports 16 and 17 can be pivoted in a horizontal plane in a certain range and can be extended to different widths downwards.

Figure 3:
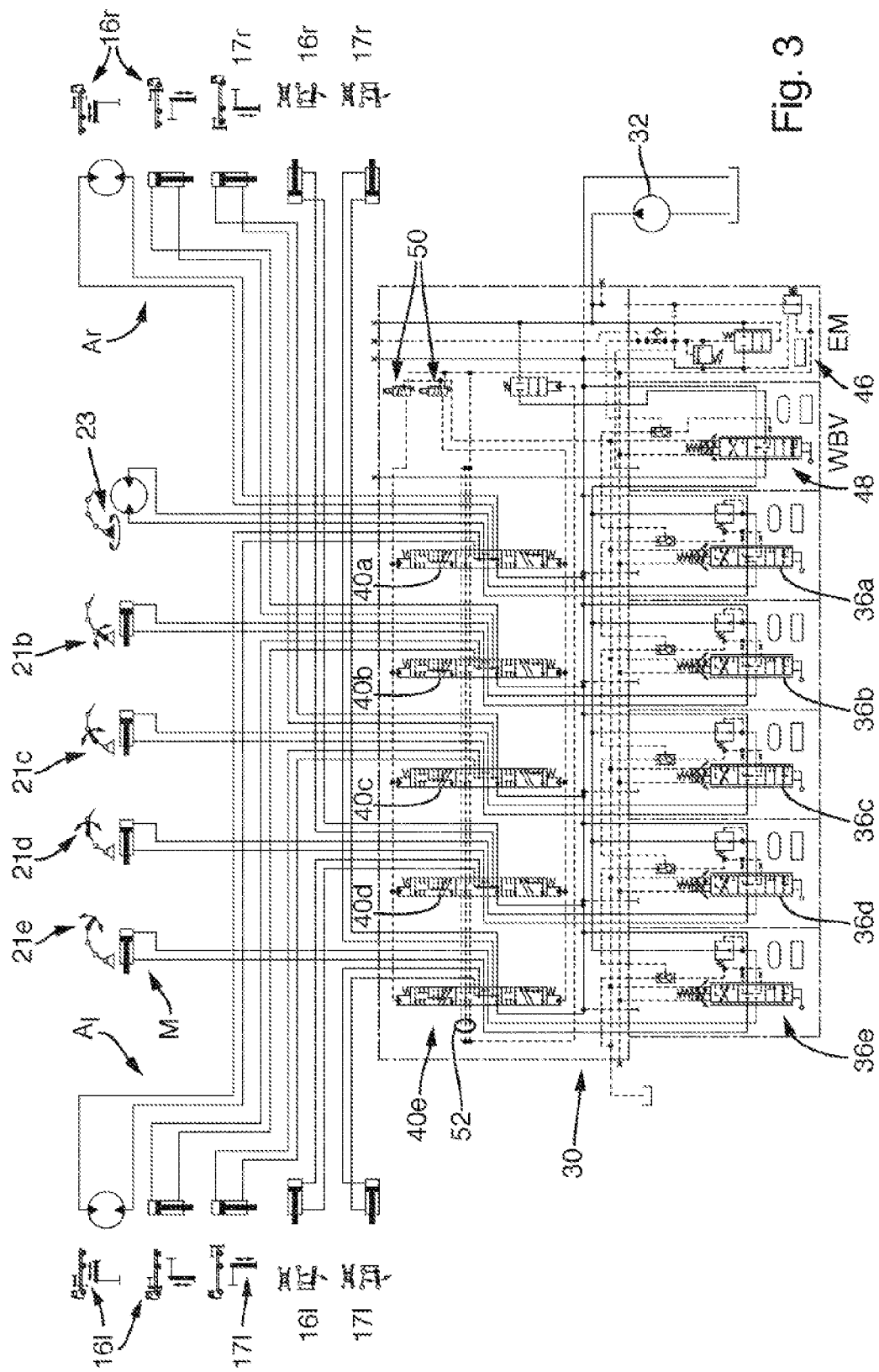
FIG. 3 shows a detailed representation of the structure of the hydraulic arrangement including various actuation possibilities for the supports and the mast arrangement.
Figure 4:
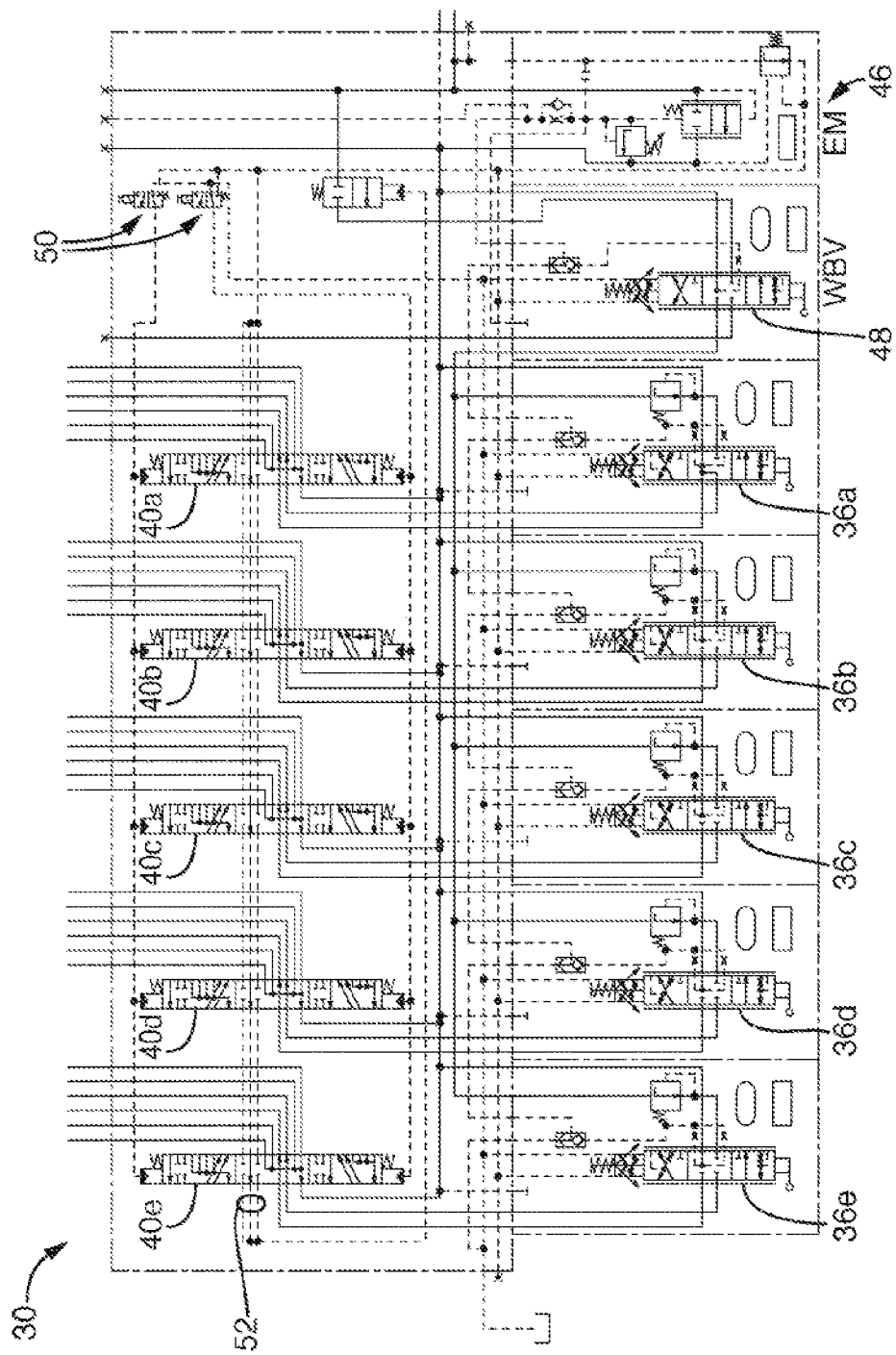
FIG. 4 shows a slightly enlarged representation of the valve arrangement from FIG. 3.

A mast arrangement 20 is provided on utility surface 14, with four mast elements 21*b* to 21*e* on a rotary table 23. Mast elements 21*b-e* are folded together for transport, in FIG. 3 they are folded apart at least schematically.

At the rear on vehicle 11, a pump module 25 is provided into which concrete is poured from above and which then pumps in a familiar manner this poured concrete or generally thick matter through a movable line along mast arrangement 20 or its mast elements 21.

An operating field 27 is furthermore provided as an above-mentioned actuation apparatus or operating point on utility surface 14. In addition, a valve arrangement 30 is represented schematically which, however, does not necessarily have to be visible. The valves thereof are actuated by means of operating field 27.

Figure 2:
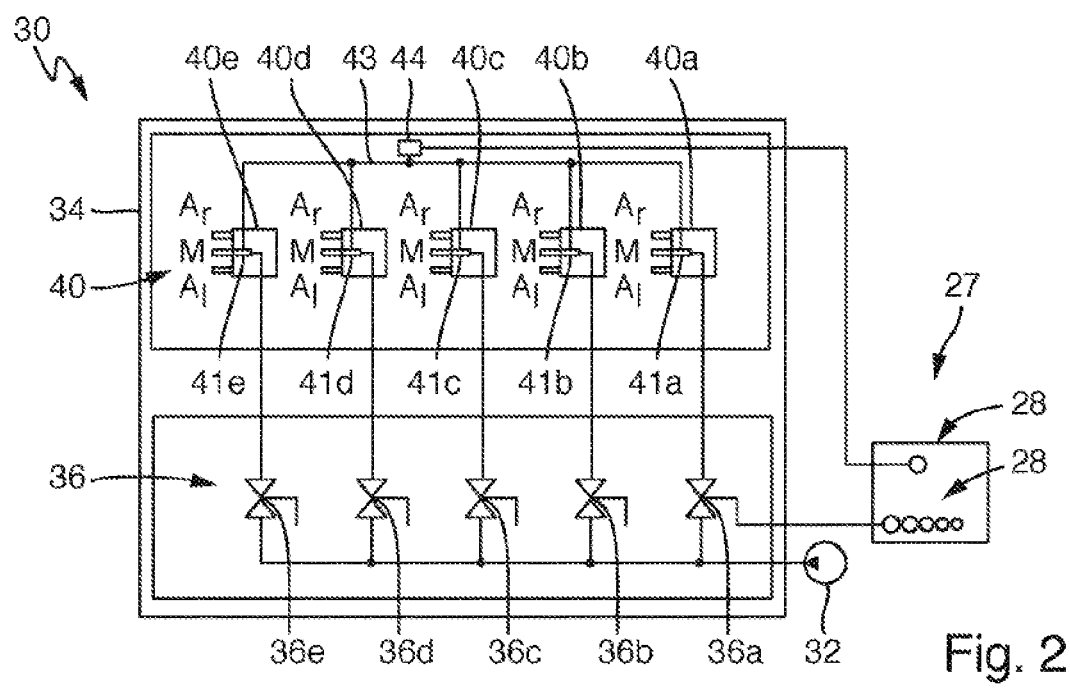
FIG. 2 shows a highly simplified representation of a valve arrangement according to an embodiment of the invention for the vehicle from FIG. 1 with a group of proportional valves, downstream of which a group of switching valves are connected.

In the simplified representation according to FIG. 2, a valve arrangement 30 is represented in detail. A hydraulic pump 32 is represented at the bottom right, which hydraulic pump 32 pumps hydraulic fluid with pressure into valve arrangement 30. Valve arrangement 30 has a valve carrier plate 34 on which proportional valves 36 are arranged or mounted in the lower region and, in the upper region, switching valves 40 as a group.

Each of proportional valves 36a to 36e which have in each case an actuation 37a to 37e proceeds in each case to precisely one downstream switching valve 40a to 40e, and indeed directly. Proportional valves 36a to 36e and switching valves 40a to 40e are in each case formed to be identical. Proportional valves 36a to 36e are advantageously formed as pressure-compensated proportional valves.

Switching valves 40a to 40e have in each case three outlets which are arranged identical in the case of all the switching valves. It is possible to switch between the three outlets by means of an adjustable valve 41a to 41e for each switching valve 40a to 40e. All valves 41a to 41e are moved simultaneously by a joint activating apparatus 43 and also moved in a similar manner. An actuator 44 is provided for this purpose. Actuator 44 is, just like actuation 37a to 37e of proportional valves 36, connected to in each case one of several operating elements 28 of operating field 27 for actuation.

The lowermost output of switching valves 40a to 40e proceeds to group Al of left-hand supports 16l and 17l. Central outputs M all proceed to mast arrangement 20 including rotary table 23. Uppermost outputs Ar proceed to right-hand supports 16r and 17r represented at the top right in FIG. 3.

As a result of the simultaneous adjustment according to the invention and described above within switching valves 40a to 40e, it is thus ensured that either only the left-hand supports, only the mast arrangement including rotary table or only the right-hand supports can be actuated or their hydraulic drives. A feedback line explained above or feedback is not yet installed or not represented here.

In the position represented in FIG. 2 of valves 41a to 41e in the central position for mast arrangement 20 or rotary table 23, in each case a hydraulic drive of mast arrangement 20 or rotary table 23 can be driven by means of proportional valves 36a to 36e. This is clearly apparent top center in FIG. 3. First switching valve 40a is responsible for rotary table 23 in the central position for mast arrangement M. In the lower position, it is responsible for right-hand supports Ar, and indeed for the horizontal extension of front right-hand support 16r. In the uppermost position, it is responsible for the horizontal extension of left-hand front support 16l or actuates the corresponding hydraulic drive. If switching valve 40a is located in one of three positions, either rotary table 23 with mast arrangement 20 can thereupon be rotated in one or the other direction by corresponding activation of precisely and directly assigned proportional valve 36a by means of operating field 27. In one of the two other positions, either left-hand front support 16l or right-hand front support 16r can be further extended or further retracted in the horizontal direction. It is clear here that associated proportional valve 36 must be depressurized prior to adjustment of switching valve 40.

Second switching valve 40b is, in central position M, connected to first, lowermost mast element 21b or its hydraulic drive. In the upper position, it is connected to left-hand front support 16l or the hydraulic drive in order to extend it downwards in the vertical direction. In the lower position, it is connected to the hydraulic drive of right-hand front support 16r in order to move it in the vertical direction.

Third switching valve 40c is, in central position M, connected to second mast element 21c or its hydraulic drive, as is apparent. In the upper position, it is connected to the hydraulic drive of left-hand rear support 17l in order to extend it in the vertical direction. In the lower position, it is connected to the hydraulic drive of right-hand rear support 17r for vertical movement.

Fourth switching valve 40d is, in central position M, connected to third mast element 21d or its hydraulic drive. In the upper position, it is connected to a hydraulic drive for horizontal pivoting of left-hand front support 16l. In the lower position, it is connected to the hydraulic drive for right-hand front support 16r in order to pivot it to and fro in the horizontal plane.

Fifth switching valve 40e is, in central position M, connected to the hydraulic drive for fourth, last mast element 21e. In the upper position, it is connected to the hydraulic drive for left-hand rear support 17l in order to pivot it in the horizontal plane. In the lowermost position of its valve, it is connected to the hydraulic drive for right-hand rear support 17r in order to pivot it in the horizontal plane.

It is thus clear that either mast arrangement 20 or its four mast elements 21b to 21e or rotary table 23 can be actuated or their hydraulic drives in each of the three positions of valves 41 of switching valves 40. In a further position, all supports 16l and 17l can be moved on the left-hand side of vehicle 11, and in a yet further position, all right-hand supports 16r and 17r can be moved.

The exact hydraulic circuit diagram is apparent from the detailed representation, already partially described above, of valve arrangement 30. It is apparent how in each case precisely one single switching valve 40a to 40e is connected directly downstream of each proportional valve 36a to 36e. Proportional valves 36a to 36e and switching valves 40a to 40e are also in actual fact advantageously mounted on a joint valve carrier plate, which is not represented here. Here, valve arrangement 30 also has at the bottom right an inlet module 46 and, connected downstream thereof, a selector operating mode valve 48. Two electric pilot valves 50 are provided at the top right.

In order to ensure, as has been mentioned above, that all switching valves 40a to 40e or their valves 41a to 41e are in the same position, so that an operator knows precisely which hydraulic drive or which functional unit is activated by activating corresponding proportional valve 36a to 36e via operating field 27, here a hydraulic feedback 52 is represented by a dashed line. It goes through all switching valves 40a to 40e and is only closed if all switching valves 40a to 40e are actually in the same position. Only then is in each case one of the above-mentioned groups actuated. The hydraulic feedback is otherwise interrupted, and as a result it can be provided that none of proportional valves 36a to 36e can be opened. A fault message should furthermore be output visually and/or acoustically, optimally at least on operating field 27, particularly advantageously, however, also at a further point.

As a result of the direct connection of switching valves 40a to 40e downstream of proportional valves 36a to 36e, advantageously with short line lengths therebetween, a compact valve arrangement 30 which can easily be overseen and is easy to maintain can be created.

The invention claimed is:

1. A vehicle for a thick matter pump apparatus, comprising:
   at least two supporting devices for supporting and/or orienting the vehicle;
   a mast arrangement which is rotatable and which has several partial mast elements which are movable independently of one another;
   a hydraulic drive arrangement for the supporting devices and the mast arrangement which has hydraulic drives for in each case movement of the supporting devices and the movable partial mast elements;
   a valve arrangement in order to move one of the supporting devices and/or one of the partial mast elements via the hydraulic drive arrangement and its hydraulic drives,
   wherein
   the valve arrangement has a group of proportional valves for control of the hydraulic drive arrangement,
   the valve arrangement has a group of switching valve apparatuses which are connected in each case to at least one hydraulic drive of the supporting devices or the partial mast elements,
   the switching valve apparatuses are connected downstream of the proportional valves,
   precisely one switching valve apparatus or several switching valve apparatuses are supplied by precisely one proportional valve or are connected downstream of precisely one single proportional valve,
   outlets of the proportional valves lead exclusively to inlets of the switching valve apparatuses,
   each of the switching valve apparatuses has between two and five outputs, wherein each output leads to one of the hydraulic drives of the supporting devices or the mast arrangement, and
   in the case of each switching valve apparatus, precisely two outputs lead to the hydraulic drives of the supporting devices and precisely one output leads to the hydraulic drives of the mast arrangement;
   a selector operating mode valve connected upstream of the group of proportional valves coming from an oil pump, wherein
   a single oil feed to the oil pump including an inlet module is connected upstream of the selector operating mode valve.

2. The vehicle according to claim 1, wherein
   precisely one single switching valve apparatus is connected downstream in each case of precisely one single proportional valve.

3. The vehicle according to claim 1, wherein
   all of the switching valve apparatuses have between one another the same setting possibilities and adjustment possibilities.

4. The vehicle according to claim 1, wherein
   all of the proportional valves have between one another the same setting possibilities and adjustment possibilities.

5. The vehicle according to claim 1, wherein
   each of the switching valve apparatuses has three or four outputs.

6. The vehicle according to claim 5, wherein
   several outputs are arranged on each switching valve apparatus in a row,
   the outputs at the start of the row and at the end of the row lead to one of the hydraulic drives of the supporting devices, and
   a central output of the row leads to one of the hydraulic drives of the mast arrangement.

7. The vehicle according to claim 1, wherein
   the selector operating mode valve is formed to adjust all of the switching valve apparatuses simultaneously and in the same manner between in each case a position for an output.

8. The vehicle according to claim 7, wherein
   an adjustment of the switching valve apparatuses adjusts, via the selector operating mode valve, said switching valve apparatuses for actuation of hydraulic drives only of the supporting devices on one hand or only of the mast arrangement on the other hand.

9. The vehicle according to claim 8, wherein,
   within the hydraulic drives of the supporting devices, a differentiation is made into precisely two groups between supporting devices on a left-hand side of the vehicle and supporting devices on a right-hand side of the vehicle, wherein the two sides are not jointly and/or simultaneously adjustable.

10. The vehicle according to claim 9, further comprising:
    a monitoring apparatus which ascertains whether all of the switching valve apparatuses are in a same position so as to actuate only hydraulic drives of the supporting devices or only hydraulic drives of the mast arrangement or a separate group of hydraulic drives, wherein
    the monitoring apparatus closes a safety valve in the event that not all of the switching valve apparatuses are in the same position, which safety valve is connected upstream of the proportional valves, and also is connected upstream of the selector operating mode valve so that the entire valve arrangement cannot bring about any pressure change or any actuation for one of the hydraulic drives of the hydraulic drive arrangement.

11. The vehicle according to claim 1, wherein
    the switching valve apparatuses and/or the selector operating mode valve are actuatable electrically via an actuation apparatus, and
    the actuation apparatus has operating elements for an operator, wherein the actuation apparatus is provided at a central, joint point of the vehicle.

12. The vehicle according to claim 11, wherein
    the actuation apparatus is at a distance of at least 1 m from the supporting devices and the mast arrangement.

13. The vehicle according to claim 1, wherein
    all proportional valves and all switching valve apparatuses are arranged on a joint valve carrier, and
    the joint valve carrier has a carrier plate for fastening the proportional valves and switching valve apparatuses.

14. A vehicle for a thick matter pump apparatus, comprising:
    at least two supporting devices for supporting and/or orienting the vehicle;
    a mast arrangement which is rotatable and which has several partial mast elements which are movable independently of one another;
    a hydraulic drive arrangement for the supporting devices and the mast arrangement which has hydraulic drives for in each case movement of the supporting devices and the movable partial mast elements;
a valve arrangement in order to move one of the supporting devices and/or one of the partial mast elements via the hydraulic drive arrangement and its hydraulic drives,
wherein
the valve arrangement has a group of proportional valves for control of the hydraulic drive arrangement,
the valve arrangement has a group of switching valve apparatuses which are connected in each case to at least one hydraulic drive of the supporting devices or the partial mast elements,
the switching valve apparatuses are connected downstream of the proportional valves,
precisely one switching valve apparatus or several switching valve apparatuses are supplied by precisely one proportional valve or are connected downstream of precisely one single proportional valve,
outlets of the proportional valves lead exclusively to inlets of the switching valve apparatuses,
each of the switching valve apparatuses has between two and five outputs, wherein each output leads to one of the hydraulic drives of the supporting devices or the mast arrangement, and
in the case of each switching valve apparatus, precisely two outputs lead to the hydraulic drives of the supporting devices and precisely one output leads to the hydraulic drives of the mast arrangement,
a selector operating mode valve connected upstream of the group of proportional valves coming from an oil pump, wherein
the switching valve apparatuses and/or the selector operating mode valve are actuatable electrically via an actuation apparatus, and
the actuation apparatus has operating elements for an operator, wherein the actuation apparatus is provided at a central, joint point of the vehicle.

\* \* \* \* \*